Oct. 5, 1965  A. J. ELAND  3,210,149
METHOD OF PRODUCING MONOCRYSTALS A SEMI-CONDUCTIVE
VIA THE VAPOUR PHASE
Filed March 15, 1962

INVENTOR
ADRIANUS J. ELAND
BY
AGENT

United States Patent Office 3,210,149
Patented Oct. 5, 1965

3,210,149
METHOD OF PRODUCING MONOCRYSTALS OF A SEMICONDUCTOR VIA THE VAPOR PHASE
Adrianus Johannes Eland, Eindhoven, Netherlands, assignor to North American Philips Company, Inc., New York, N.Y., a corporation of Delaware
Filed Mar. 15, 1962, Ser. No. 179,892
Claims priority, application Germany, Mar. 27, 1961, N 19,798
5 Claims. (Cl. 23—1)

The invention relates to a method of producing monocrystals of a substance, for example a semi-conductive substance via the vapour phase, particularly by the sublimation of the substance or by the reaction of the initial constituents of the substance in the vapor phase, in which method under the action of a temperature gradient in part of a vessel, preferably in a constricted part of the vessel, a crystal nucleus of the substance is formed from the vapour, on which crystal the substance is further deposited.

In a conventional embodiment of this known method a quantity of the substance to be treated is heated to a high temperature and evaporated in a closed, elongated tube, for example a quartz tube at one end. The vapour is then conveyed in the tube in a temperature gradient produced by a furnace to a colder part of the tube, where the substance is deposited in crystalline form from the vapour phase. For the production of monocrystals of compounds, for example CdS, a method has been proposed in which a carrier gas containing a component of the compound, for example hydrosulphuric acid, is conveyed in a tube provided with inlet and outlet ducts over a strongly heated charge of the other component, for example cadmium, after which the flow of gas charged with CdS vapour is deposited in a crystalline form at a further place of the vessel.

With this method it is indeed possible to obtain a large number of small crystals of different shapes, for example needles or wafers, and of different size, but in practice it is not possible or it is extremely difficult to cultivate in this manner a single crystal. In order to improve the crystal growth during the deposition it has been proposed to displace the vessel with respect to the temperature gradient in accordance with the rate of growth. In order to improve the nucleation and to obtain a single crystal a vessel is used having a narrow end portion, particularly a tapering end. By local cooling of the point a nucleus is then first formed in this end and the crystal is allowed to grow on this nucleus into the vessel. Any further nuclei formed during this cooling process can be previously removed by heating of the place concerned of the vessel.

However, this method of nucleus formation gives rise to difficulties and it has been found that even after the application of many of these improvements a regular growth of a fairly large crystal cannot yet be achieved in many cases, since even after a thorough cleaning of the vessel the formation of a single nucleus cannot be realised and during the deposition new nuclei are formed on the wall of the vessel, which nuclei disturb or interfere with the regular growth of the main nucleus.

The invention has for its object, inter alia, to provide a particularly efficaceous method for producing monocrystals from the vapour phase, in which the aforesaid difficulties are materially reduced.

With the method of the kind set forth in the preamble for the production of a monocrystal from the vapour phase, the vessel is first subjected to a temperature gradient of opposite course for cleaning the nucleation area and/or the deposition area, in accordance with the invention, prior to the nucleation and deposition during the first temperature gradient.

This treatment in a reverse temperature gradient immediately prior to the nucleation ensures that in the proximity of the nucleation area particles of the substance or other disturbing substances, which are left even after extremely thorough cleaning and which are conducive to the formation of disturbing additional nuclei, are conveyed as far as possible to the other end of the vessel. Thus the nucleation is simplified and the possibility of additional, disturbing nuclei being formed during the deposition is considerably reduced.

The reverse temperature gradient may be produced for example by means of an auxiliary furnace which initially raises to this end temporarily the temperature of the vessel part concerned. In a preferred further embodiment of the method according to the invention, use is made of a furnace having a temperature distribution which exhibits a maximum between two temperature gradients of relatively opposite course, the nucleation and deposition being performed during one of these temperature gradients and the cleaning process being carried out during the other prior to the nucleation. The whole treatment is then carried out in a simple manner by shifting the vessel in place in the same furnace.

After the treatment in the temperature gradient of the reverse course the nucleation may be performed by arranging the vessel in the temperature gradient corresponding to the growth so that the extreme end is at a temperature below the nucleation temperature. To this end, subsequent to the treatment in the reverse temperature gradient the end of the vessel intended for the nucleation is preferably arranged with respect to the other temperature gradient so that no nucleation can yet take place at the area concerned, after which the vessel with its extreme end is slowly shifted towards the nucleation temperature. Thus the nucleus is indeed compulsorily formed at the extreme end in a simple manner without the need for additional measures to obtain the nucleation at the area concerned. This method can be carried out in a particularly simple manner in the aforesaid furnace with two temperature gradients of relative opposite course by displacing the vessel between the two gradients.

When the nucleus has been formed, the further deposition may be obtained by maintaining the temperature gradient. The vessel with its extreme end is preferably displaced during the deposition on the nucleus with respect to the temperature gradient. By this displacement in accordance with the rate of deposition the same temperature conditions are maintained at the surface of growth, so that the growth will take place uniformly from the nucleus and an addition nucleation is further reduced.

The preliminary treatment, the nucleation and the deposition may be carried out in a particularly simple manner in a furnace, the temperature distribution of which has a maximum between two temperature gradients of opposite variations by displacing the vessel in a given direction through the furnace.

It has been found to be particularly advantageous to carry out the manufacture in a closed, cylindrical vessel, particularly with a tapering end portion. The vessel is preferably displaced in a vertical sense through the furnace and the starting substance is provided at the lower end of the vessel, whereas the deposition takes place at the top end of the vessel. However, as an alternative, use may be made of a vessel having inlet and outlet ducts, through which a flow of carrier gas can be led. When a closed vessel is used, contamination of the area of nucleation is avoided as far as possible.

The invention will now be described more fully with reference to an example and the accompanying drawing, in which.

With reference to these figures the manufacture of a CdS monocrystal will be described by way of example.

Figure 1:
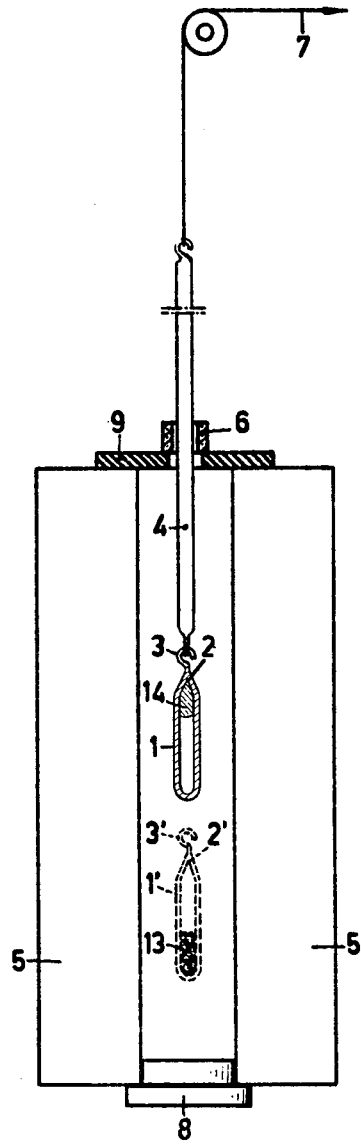
FIG. 1 shows diagrammatically in a longitudinal sectional view an apparatus for carrying out the method according to the invention.

From FIG. 1 it appears that the manufacture takes place in a closed quartz tube 1 (length 20 cms., inner diameter 1 cm.) having a uniform taper over a length of for instance 30–40 mms. forming a constricted, sharp end 2 with an eyelet 3. It will be clear that the length of the tube and of the constricted part may be varied. Moreover the tapering is not necessarily uniform; as long as at the extreme end one starts from a point-like cross-section to an increasing cross-section, the nucleation is improved. With this eyelet 3 is connected a quartz rod 4, which projects beyond the furnace 5 and can be drawn up slowly via a passage 6 by means of a steel wire 7. The tube is displaced in a vertical sense through the heating furnace 5, which has a length of about 80 cms. and an inner diameter of about 4 cms. At the lower end the furnace 5 is closed by a plug 8 of heat-insulating material and at the top end by an asbestos disc 9.

Figure 2:
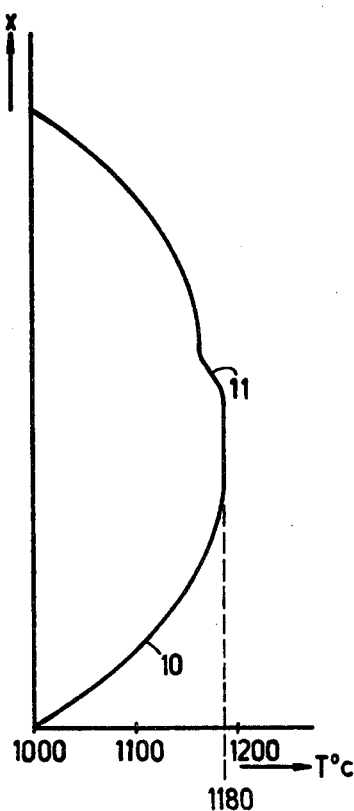
FIG. 2 shows in a graph the temperature distribution in the furnace used in the method according to the invention.

FIG. 2 shows in a graph the temperature variation along the axis of the furnace by the curve 10. On the abscissa is plotted in this figure the temperature T linearly in degrees centigrade and on the ordinate is plotted the distance $x$ from the bottom of the furnace. From this figure it will be seen that the temperature distribution in the furnace has approximately at the centre a maximum of about 1180° C. On either side of this maximum temperature gradients $dT/dx$ prevail with opposite courses. Whereas the temperature increases uniformly from the bottom of the vessel up to the maximum value, referred to by 10, it decreases first strongly in the region 11 of the curve, the drop in temperature being about 30° C., after which the temperature further decreases. This temperature drop may be produced in known manner by a correspondingly irregular winding of the heating resistor. In this temperature region sublimation takes place. It should be noted that while such a temperature distribution is preferably used, the normal drop in temperature (i.e., the same curve without the abrupt drop 11) may, as an alternative, be used as the gradient for growth.

The quartz tube 1', shown in broken lines in FIG. 1, with the top 2' and the eyelet 3', corresponds with the quartz tube 1 with the tip 2 and the eyelet 3, but in an earlier stage of the method, i.e., in the initial stage. In this initial stage the quartz tube 1' contains at its bottom 10 gs., of CdS powder 13. The preparation and filling of the quartz tube are carried out in the following manner.

First the quartz tube 1, which is still open at the end opposite the sharp tip 2, is cleaned with boiling nitric acid and after it is rinsed several times with boiling distilled water, it is dried at 100° C. for a few hours. Then the tube is connected with the exhaust pump and after 10 gs. of CdS powder has been introduced, the tube is heated in vacuo at about 900° C. for a quarter of an hour, after which the tube is sealed.

After the furnace 5 has been heated to the maximum temperature of 1180° C., the quartz tube is introduced in the position 1' shown in broken lines in the figure, into the furnace, after which, as will be seen from FIG. 2, the sharp tip 2 assumes approximately the maximum temperature, so that in the vessel 1' prevails a temperature gradient such that any particles of the substance or any other disturbing substances likely to form disturbing nuclei afterwards, at the end, particularly at the tip of the tube, are transferred to the bottom of the vessel, where the starting charge 13 is provided. The tip 2 is thus cleaned very thoroughly. After the tube has been held in the position 1' for about two hours, the drawing operation starts. The rate of drawing is kept accurately constant at 2 cms. per 24 hours. After the maximum temperature and the temperature drop in accordance with the curve of FIG. 2 have been passed by, that temperature at the tip is reached at which a nucleus can be formed at the extreme end. Since, in accordance with a preferred embodiment of the method according to the invention, prior to the nucleation the tip 2' with the extreme end is located in the furnace in front of the area of nucleation temperature and the tip 2 is slowly moved from there towards the area of nucleation temperature, the advantage is obtained that the nucleus is automatically and compulsorily formed at the extreme end and that at the further parts of the tip no disturbing nuclei can yet be produced.

After the nucleation the tube can be displaced over a short distance in upward direction, in which position it is held for the further deposition. However, also during the deposition the tube is preferably drawn up slowly, for example with the same drawing rate of 2 cms. per 24 hours.

After the tube has been drawn in for six days, starting from the position shown in broken lines (1', 2', 3'), it occupies the position shown in FIG. 1 (1, 2, 3). When the tube is removed from the furnace, it is found that the starting powder 13 has been deposited, during these six days, at the top end of the tube from the point 2 as a monocrystal 14 having the shape of a rod with a length of about 6 cms. corresponding to the shape of the tube.

In the same manner monocrystals of ZnTe and CdSe have been manufactured. It will be clear that the invention can be applied in a similar way to other substances which can be sublimated, for instance sulphides, oxides and selenides.

Finally it should be noted that the invention is not restricted to the embodiments shown by way of example and that those skilled in the art may apply numerous modifications within the scope of the invention. In order to reduce the duration of the treatment, the displacement between the position in which the treatment takes place in the reverse temperature gradient and the position reached shortly before the nucleation temperature area may be carried out more rapidly, while yet preferred method of nucleation described above may be employed. For mass production a plurality of these vessels can be drawn in order of succession through the same furnace and use may be made of a quartz rod having a number of arms each supporting a vessel. The measures according to the invention may be carried out in the same manner also in those producing methods in which the compound is formed from its constituents by reaction via the vapor phase. In the furnace a number of temperature gradients may be produced, while the starting substance is not heated at once to the high temperature, but a zone of high temperature is displaced in accordance with the displacement of the vessel through the starting material.

What is claimed is.

1. A method of growing a single crystal via a vapor phase, comprising establishing a first heated zone at a high temperature and at opposite sides second and third heated zones at temperatures lower than that of said first zone, providing within an elongated vessel at one end thereof a charge of a polycrystalline substance which will vaporize upon heating and from which is is desired to grow a single crystal, the other end of said vessel being adapted to serve as a nucleation site for condensed vapor, the high and lower temperatures at said first and at said second and third heated zones being of values at which vaporization and condensation, respectively, of said substance occur therein, disposing said vessel relative to said heated zones such that the vessel is located in the second zone at lower temperature with said other end adjacent the said first zone and the said one end remote from the said first zone, thereafter slowly relatively displacing the vessel and zones such that the said other end of the vessel containing the nucleation site passes first from the second zone into and through the first zone and then into the third zone followed by the said one end containing the charge which becomes located in the first zone whereby the vapors thereof produced at the first zone travel to and condense to grow a substantially single crystal at the cleaned nucleation site in the third zone.

2. A method as set forth in claim 1 wherein the heating zones are arranged vertically with the second zone lowermost, the first zone above the second zone, and the third zone above the first zone, the vessel is disposed vertically with the said other end uppermost, and the vessel is moved upward through the second, first and third zones in succession.

3. A method of growing a single crystal via a vapor phase, comprising establishing a first heated zone at a high temperature and at opposite sides second and third heated zones at temperatures lower than that of said first zone providing a first increasing temperature gradient between the second and first zones and a second decreasing temperature gradient between the first and third zones, providing within an elongated vessel at one end thereof a charge of a polycrystalline substance selected from the group consisting of semiconductive compounds that will sublimate and vaporize upon heating, and constituents of semiconductive compounds that will vaporize upon heating and react in the vapor phase to form the compound, the other end of said vessel being constricted and adapted to serve as a nucleation site for condensed vapor, the high and lower temperatures at said first and at said second and third heated zones being of values at which vaporization and condensation, respectively, of said substance occur therein, disposing said vessel in the second zone at lower temperature with said other end adjacent the said first zone and the said one end remote from the said first zone, thereafter slowly relatively displacing the vessel and zones such that the said other end of the vessel containing the nucleation site, for cleaning purposes, passes first through the increasing temperature gradient, then through the first zone and then through the decreasing temperature gradient where condensation may occur, followed always by the said one end containing the charge which becomes located in the first zone whereby the vapors produced at the first zone condense to grow a substantially single crystal at the cleaned nucleation site in the third zone.

4. A method as set forth in claim 3 wherein the heated zones remain fixed, and the vessel is drawn through them.

5. A method as set forth in claim 3 wherein the vessel is sealed, the constricted end is sharply tapered, and the vessel is moved vertically through the heated zones.

References Cited by the Examiner
UNITED STATES PATENTS 3,042,501   7/62   Noblitt _____ 23—294

OTHER REFERENCES

Lawson et al.: Preparation of Single Crystals, QD 931, L3, 1958, C.2, pages 21 to 23.

Semiconductors, by Hannay Reinhold Publishing Corp., Feb. 27, 1959, pages 96 to 98 and 137.

NORMAN YUDKOFF, *Primary Examiner.*

ANTHONY SCIAMANNA, *Examiner.*